United States Patent
Uy et al.

(10) Patent No.: US 11,272,340 B2
(45) Date of Patent: Mar. 8, 2022

(54) SYSTEMS AND METHODS FOR SHORT-RANGE WIRELESS PAIRING AND CONNECTIVITY

(71) Applicant: Verizon Patent and Licensing Inc., Basking Ridge, NJ (US)

(72) Inventors: Warren Hojilla Uy, Randolph, NJ (US); Samirkumar Patel, Middlesex, NJ (US); Young R. Choi, Belle Mead, NJ (US); Emilia C. Quijano, East Brunswick, NJ (US); Dayong He, Bridgewater, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/861,764

(22) Filed: Apr. 29, 2020

(65) Prior Publication Data
US 2021/0345080 A1 Nov. 4, 2021

(51) Int. Cl.
*H04W 12/61* (2021.01)
*H04W 4/80* (2018.01)
*H04W 84/18* (2009.01)
*H04W 8/00* (2009.01)
*H04W 88/06* (2009.01)
*H04W 76/10* (2018.01)

(52) U.S. Cl.
CPC ............ *H04W 4/80* (2018.02); *H04W 8/005* (2013.01); *H04W 76/10* (2018.02); *H04W 84/18* (2013.01); *H04W 88/06* (2013.01)

(58) Field of Classification Search
CPC combination set(s) only.
See application file for complete search history.

(56) References Cited

U.S. PATENT DOCUMENTS

| | | | |
|---|---|---|---|
| 2011/0081860 A1* | 4/2011 | Brown | H04N 1/327 455/41.3 |
| 2013/0095753 A1* | 4/2013 | Chen | H04L 67/104 455/41.1 |
| 2014/0278836 A1* | 9/2014 | Mannino | G06Q 40/04 705/12 |
| 2016/0087967 A1* | 3/2016 | Pang | H04W 76/11 726/6 |
| 2017/0102903 A1* | 4/2017 | Nagasawa | G06F 3/1222 |
| 2017/0200152 A1* | 7/2017 | Winkler | G06Q 20/204 |
| 2018/0077045 A1* | 3/2018 | Lee | H04L 43/18 |
| 2018/0184177 A1* | 6/2018 | Beals | H04N 21/2351 |
| 2018/0309744 A1* | 10/2018 | Chou | G06F 21/31 |
| 2019/0229898 A1* | 7/2019 | Kwen | H04L 9/0822 |
| 2020/0382950 A1* | 12/2020 | Fornshell | H04W 12/61 |

* cited by examiner

*Primary Examiner* — Cindy Trandai

(57) ABSTRACT

A method, device, and computer-readable medium provide for establishing, by a fixed wireless access (FWA) device in a customer premises equipment (CPE) network, a communication channel with a user device; dynamically generating, by the FWA device, a one-time personal identification number (PIN); sharing, by the FWA device, the one-time PIN with the user device; pairing, by the FWA device and based on activation of one-time PIN, the user device via a short-range connection; and performing, by the FWA device using the short-range connection, at least one of setup or installation of one or more devices in the CPE network.

20 Claims, 6 Drawing Sheets

SYSTEMS AND METHODS FOR SHORT-RANGE WIRELESS PAIRING AND CONNECTIVITY

BACKGROUND INFORMATION

Residential, business, and public spaces may implement a Layer 2 and/or Layer 3 local area network (LAN) that enables data connectivity for end devices to the Internet or other large-scale public networks over a radio access network (RAN). For example, customer premises may be served by customer premises equipment (CPE) that includes a fixed wireless access (FWA) device deployed by a provider of communication services. The FWA device may be connected to, or alternatively may also function as, a WiFi access point (AP) that provides short-range wireless access for the CPE and/or the end devices operating at the customer premises. Various end devices, such as computer devices, Internet of Things (IoT) devices, mobile phones, and/or gaming devices, having respective service profiles, may connect to the Internet via an air interface (e.g., RAN) using the CPE (e.g. FWA) device(s). Typically, CPE device setup and connection involves configuring installation locations so as to satisfy service requirements that are specified, for example, in a service level agreement (SLA).

DETAILED DESCRIPTION OF PREFERRED EMBODIMENTS

Figure 1:
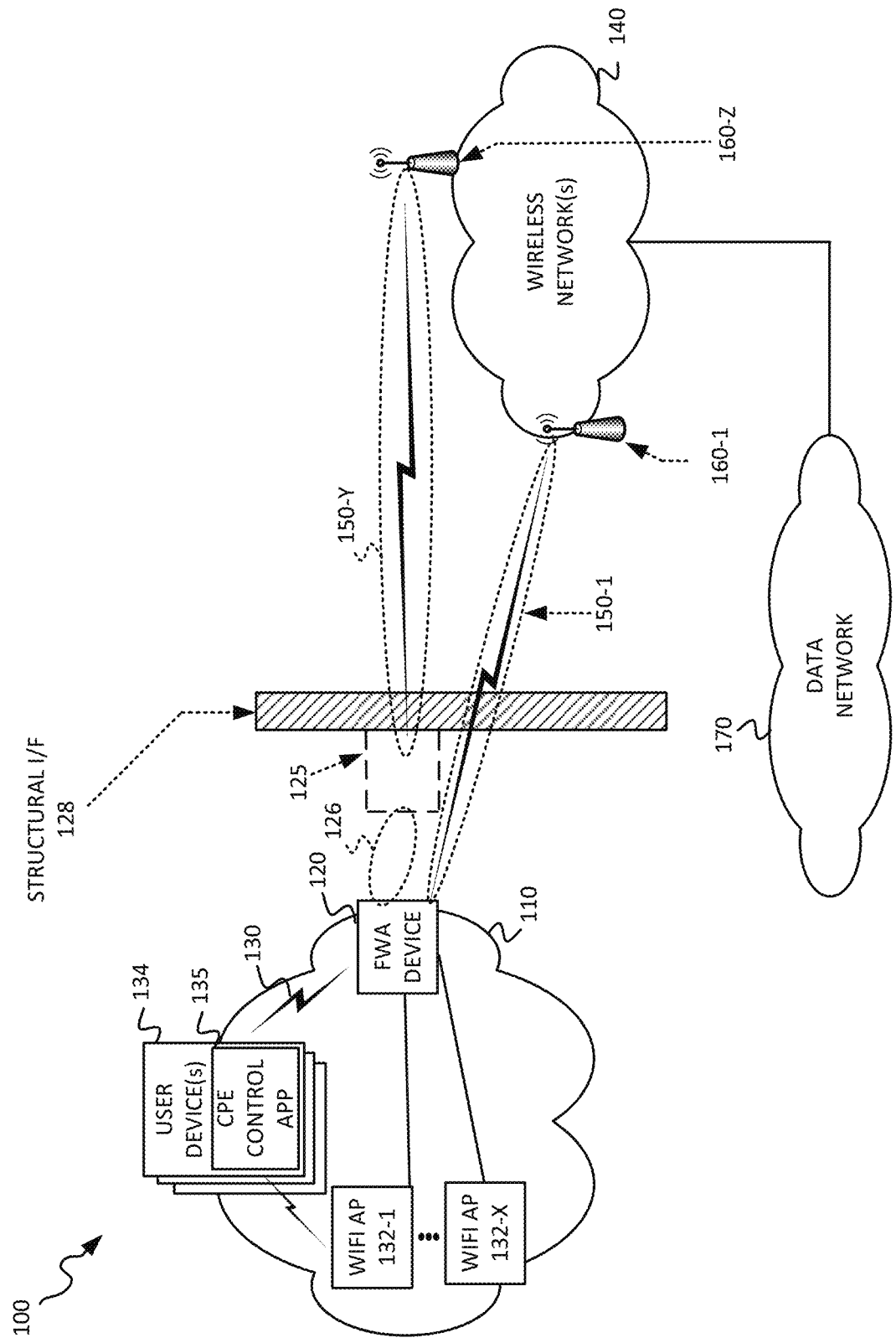
FIG. 1 is a diagram illustrating an environment according to an implementation described herein.

The following detailed description refers to the accompanying drawings. The same reference numbers in different drawings identify the same or similar elements. The following detailed description does not limit the invention, which is defined by the claims.

As communication networks and associated application services increase in size, complexity, and number of users, management of such systems has become more challenging. One solution incorporates various aspects of advanced wireless systems, such as Fifth Generation (5G) service networks, utilizing high frequency bands such as Sub 6 GHz, and directional antenna arrays. 5G New Radio (NR) millimeter (mm) wave technology may provide significant improvement in bandwidth and/or latency over alternative wireless network technologies (e.g., Fourth Generation (4G)).

For instance, the 5G NR mm-wave air interface may provide a high data throughput in comparison to the data throughput of a 4G Long Term Evolution (LTE) air interface. To take advantage of the high bandwidths available via the 5G NR air interface, a provider of communication services may deploy equipment such as fixed wireless access (FWA) devices for providing data communication services, such as Internet service that includes Voice over Internet Protocol (VoIP), video streaming, live gaming, Internet browsing, etc. Thus, instead of a wired data connection (e.g., a coaxial cable connection, etc.) or an optical connection (e.g., an optical network terminal (ONT) to an optical fiber, etc.), an FWA device may connect the customer premises to a service network through one or more wireless stations (or access units). The FWA device may function as a UE device with respect to the serving wireless stations, and may be installed at appropriate locations at the customer premises, such as a residence, a public building, a place of business, etc.

Due to the high mm-wave frequencies, the 5G NR signals between wireless stations and FWA devices at the customer premises may be susceptible to intermittent, degradations due to multipath wave propagation and fading, as a result of structure penetration losses; scattering from terrain objects, such as buildings, foliage, landscaping, vehicles, signage, etc.; reflection from bodies of water; ionospheric reflection and/or refraction; atmospheric attenuation and scattering; and/or other types of signal interference. For example, modern glass (e.g., windows, doors, etc.) often has metallic-type coatings to aid in thermal transfer characteristics (i.e., to reflect infrared radiation but pass light). Such coatings may significantly attenuate 5G radio frequency (RF) signals, thereby, limiting the reach of 5G cells within building interiors. Such variations in 5G signal quality may be particularly problematic in areas with a low density of 5G coverage, such as an area with the initial deployment of 5G wireless stations.

As such, one or more locations in a customer premises serviced by a 5G NR wireless station, such as a potential location for installation of an FWA device, may not receive 5G NR signals of sufficient strength and/or quality to satisfy service requirements. Wireless signals received at the customer premises may be strengthened by placement of an RF repeater device between the FWA device and the 5G NR wireless station. An RF repeater device may boost wireless signals. For example, the RF repeater device may receive wireless signals from a wireless station, amplify the received wireless signals, and re-broadcast the amplified wireless signals toward the FWA device. Similarly, the RF repeater device may receive wireless signals from the FWA device, amplify the received wireless signals, and re-broadcast the amplified wireless signals toward the wireless station.

CPE device installation may involve pairing of one or more CPE device and a setup-capable application executing, for example, on one or more user devices. An FWA device may include logic to interface with a CPE management application for CPE installation and setup. In one embodiment, a CPE management application may be used by a customer and/or a professional installer to perform read/write operations via a short-range wireless protocol, such as Bluetooth®, Insteon®, Infrared Data Association (IrDA), wireless universal serial bus (USB), Z-Wave®, Zigbee, or other connection standard. For example, personal area network functionality may allow an installer to use the CPE management application to read information such as signal strength values, subscriber identification module (SIM) activation, software updates, and/or another type of signal characteristic value. In some implementations, the obtained information may allow an installer to determine an appropriate setup location for one or more CPE devices at which SLA performance can be satisfied.

In some implementations, the short-range wireless connection between a CPE management application and a CPE device used for setup and installation may be automatically disabled after a period of inactivity. To re-enable the short-range wireless connection, the CPE device may need to be reset, a remote trigger from a backend server may be necessary, etc. Thus, automatic disabling the short-range wireless connection may pose an inconvenience to installers when the installation process is not completed within the allotted time for the short-range pairing, and installation is disrupted, and the installation procedure restarted.

In other implementations, the CPE management application may be configured to maintain short-range wireless connectivity with the FWA until manually disabled. However, an unsecured wireless connection may be susceptible to attacks by untrusted third parties. For example, an untrusted third-party may gain unauthorized access and uncover the content of messages between the management application and the FWA using specialized programs or other techniques, such as bluesnarfing, bluejacking, blueprinting, bluebugging, bluesmacking, bluesniping, man-in-the-middle attacks, address resolution protocol spoofing, etc. An untrusted third-party may exploit these vulnerabilities to uncover the security keys that are exchanged between devices over a personal area network, rendering the connection not secure.

In some implementations following the pairing with a user device, the FWA device may generate a one-time activation code, such as a PIN and/or other unique ID. The one-time activation code may be in the form of a visual code, such as a bar code, a quick response (QR) code, an alphanumeric code, a numeric code, a data matrix, text, and/or any other scannable code that may be displayed, for example, via a display associated with the FWA device. In other implementations, the one-time PIN may be in the form of a detectable tagged audio signal. The user device executing the CPE management application may be used to scan the activation code. Capturing the activation code may allow a secure short-range wireless connection to be established between the user device and the FWA device. Alternatively or additionally, a user device may acquire the one-time activation code using near field communication (NFC).

FIG. 1 is a diagram of an exemplary environment 100 in which the systems and methods described herein may be implemented. As shown in FIG. 1, environment 100 may include a customer premises equipment (CPE) network 110, a wireless network 140, and a data network 170.

CPE network 110 may include a local area network (LAN) associated with a customer's premises. For example, CPE network 110 may be located at or within a customer's residence, in an apartment building, on a school campus, in a commercial office building, in a public building, in a connected mass transit vehicle (e.g., bus, train, plane, boat, etc.), and/or in another type of location associated with a customer of a provider of telecommunication services. Devices attached to CPE network 110 may receive services via wireless connections between an FWA device 120 and a data network 170. The services may include, for example, a television service, Internet service, and/or voice communication (e.g., telephone) service. In one implementation, CPE network 110 may be implemented as a high-speed network, such as a gigabit network or higher. CPE network 110 may include FWA device 120, WiFi access points (APs) 132-1 to 132-X (referred to herein collectively as "WiFi APs 132" and individually as "WiFi AP 132"), and user devices 134 (referred to herein collectively as "user devices 134" and individually as "user device 134").

FWA device 120 may be installed in a particular location at the customer premises. such as a building's exterior (e.g., on a roof, attached to a structural interface 128, e.g., window, wall, etc.) or a building's interior (e.g., next to structural interface 128 or at another location associated with good wireless signal reception). FWA device 120 may be configured to attach to, and communicate with, wireless network 140 and may be perceived as a user equipment (UE) device by wireless network 140. FWA device 120 may be configured to communicate via interfaces such as, for example, both a 5G NR air interface and a 4G LTE air interface.

WiFi AP 132 may include a transceiver configured to communicate with user devices 134 using WiFi signals. In one implementation, WiFi AP 132 may be implemented as a switch, router, firewall, gateway, or another type of device. In other implementations, WiFi AP 132 may include a dynamic host configuration protocol (DHCP) server that enables user devices 134 to communicate with each other and/or with FWA device 120 via WiFi protected setup (WPS). In one implementation, WiFi AP 132 may connect to FWA device 120 via a wired connection (e.g., an Ethernet cable). Furthermore, WiFi APs 132 may include one or more Ethernet ports for connecting user devices 134 via a wired Ethernet connection. In some implementations, FWA device 120 may include, and/or perform the functions of WiFi AP 132.

User device 134 may include any computer device capable of connecting to WiFi AP 132 and/or FWA device 120 via a wired, wireless, and/or optical connection. For example, user device 134 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. User device 134 may be used for voice communication, mobile broadband services (e.g., video streaming, real-time gaming, premium Internet access etc.), best effort data traffic, and/or other types of applications. As another example, user device 134 may correspond to an embedded wireless device that communicates wirelessly with other devices over a machine-to-machine (M2M) interface using machine-type communication (MTC) and/or another type of M2M communication.

User device 134 may execute a CPE control application (App) 135 that may be activated by a user of user device 134 to function as a controller and/or manager of devices in CPE network 110. CPE control App 135 may connect to devices in CPE network 110, for example, such as FWA device 120 via a short-range wireless connection 130 as described herein. In one implementation, CPE control App 135 may include instructions for setup and/or installation of CPE devices, as described herein, and configuration of CPE network 110, including settings based on SLA information. CPE control App 135 may further manage WiFi APs 132 and/or user devices 134 connected to WiFi APs 132.

Wireless network 140 may provide access to data network 170 for wireless user devices via FWA device 120. Wireless network 140 may enable FWA device 120 to connect to data network 170 for mobile telephone service, Short Message Service (SMS) message service, Multimedia Message Service (MMS) message service, Internet access, cloud computing, and/or other types of data services. Wireless network 140 may provide a communication link between FWA device 120 and data network 170. If wireless network 140 includes a 5G standalone (SA) architecture that implements network slicing, wireless network 140 may establish a packet data network connection between FWA 120 and data network 170 via a Data Network Name (DNN). Thus, wireless network 140 may establish an IP connection between FWA device 120 and data network 170 or another network reachable via data network 170. Furthermore, wireless network 140 may enable FWA device 120 to communicate with an application server, and/or another type of device, located in data network 170 using a communication method that may or may not require the establishment of an IP connection between FWA device 120 and data network 170, such as, for example, Data over Non-Access Stratum (DoNAS).

In some implementations, wireless network 140 may include a 5G access network and/or an LTE Advanced (LTE-A) access network or other advanced network that includes functionality such as carrier aggregation; higher-order modulation schemes, such as 256 quadrature amplitude modulation (QAM), 1024-QAM, etc.; advanced or massive multiple-input and multiple-output (MIMO) configurations (e.g., a 4×4 antenna configuration, an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Furthermore, wireless network 140 may include an LTE access network (e.g., an evolved packet core (EPC) network). In other implementations, wireless network 140 may include a Code Division Multiple Access (CDMA) access network. For example, the CDMA access network may include a CDMA enhanced High Rate Packet Data (eHRPD) network (which may provide access to an LTE access network). Wireless network 140 may include LTE EPC network elements, such as a Mobility Management Entity (MME), a Serving Gateway (SGW), a Packet Data Network Gateway (PGW), a Home Subscriber Server (HSS), a Policy and Charging Rules Function (PCRF), and/or other EPC network elements.

UE devices 134 may be able to attach to both a 4G wireless station and a 5G wireless station. Dual coverage using 4G and 5G networks may be referred to as non-standalone (NSA) architecture. Thus, as described herein, wireless network 140 may include a 4G wireless station (e.g., an eNodeB (not shown)) and a 5G wireless station 160 (e.g., a gNodeB or gNB). The 4G wireless station and 5G wireless station 160 may each include one or more RF transceivers that include devices and/or components configured to enable wireless communication with FWA devices 120. 5G wireless station 160 may be configured to communicate with FWA device 120 using a 5G NR air interface, such as, for example, a service area or cell 150-1 to 150-Y (referred to herein collectively as "cells 150" and individually as "cell 150"). For example, 5G wireless station 160 may include one or more antenna arrays configured to send and receive wireless signals in the mm-wave frequency range via cells 150.

In some implementations, FWA device 120 may communicate with 5G wireless station 160 via a repeater device 125, when FWA device 120 is located at or near the outer range of cell 150-Y. Each repeater device 125 may receive signals from wireless station 160, amplify the received signals, and transmit the amplified signals toward FWA device 120. Similarly, repeater device 125 may receive signals from FWA device 120, amplify the received signals, and transmit the amplified signals toward wireless station 160. Repeater device 125 may be installed at or near a structural interface 128, interior and/or exterior, and may pair with FWA device 120 through a short-range wireless communication connection 126, such as a Bluetooth® connection or NFC. In some implementations, when FWA device 120 is located within the range of cell 150-1, repeater device 125 is not used to amplify the received signals.

Data network 170 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of data network 170 may be managed by a provider of communication services that also deploys wireless access network 140, FWA device 120, and/or repeater device 125. Data network 170 may allow the delivery of IP services to FWA device 120 and may interface with other external networks. Data network 170 may include one or more server devices and/or network devices, or other types of computation or communication devices. In some implementations, data network 170 may include an IP Multimedia Sub-system (IMS) network (not shown in FIG. 1). An IMS network delivers IP multimedia services and may provide media flows between FWA device 120 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
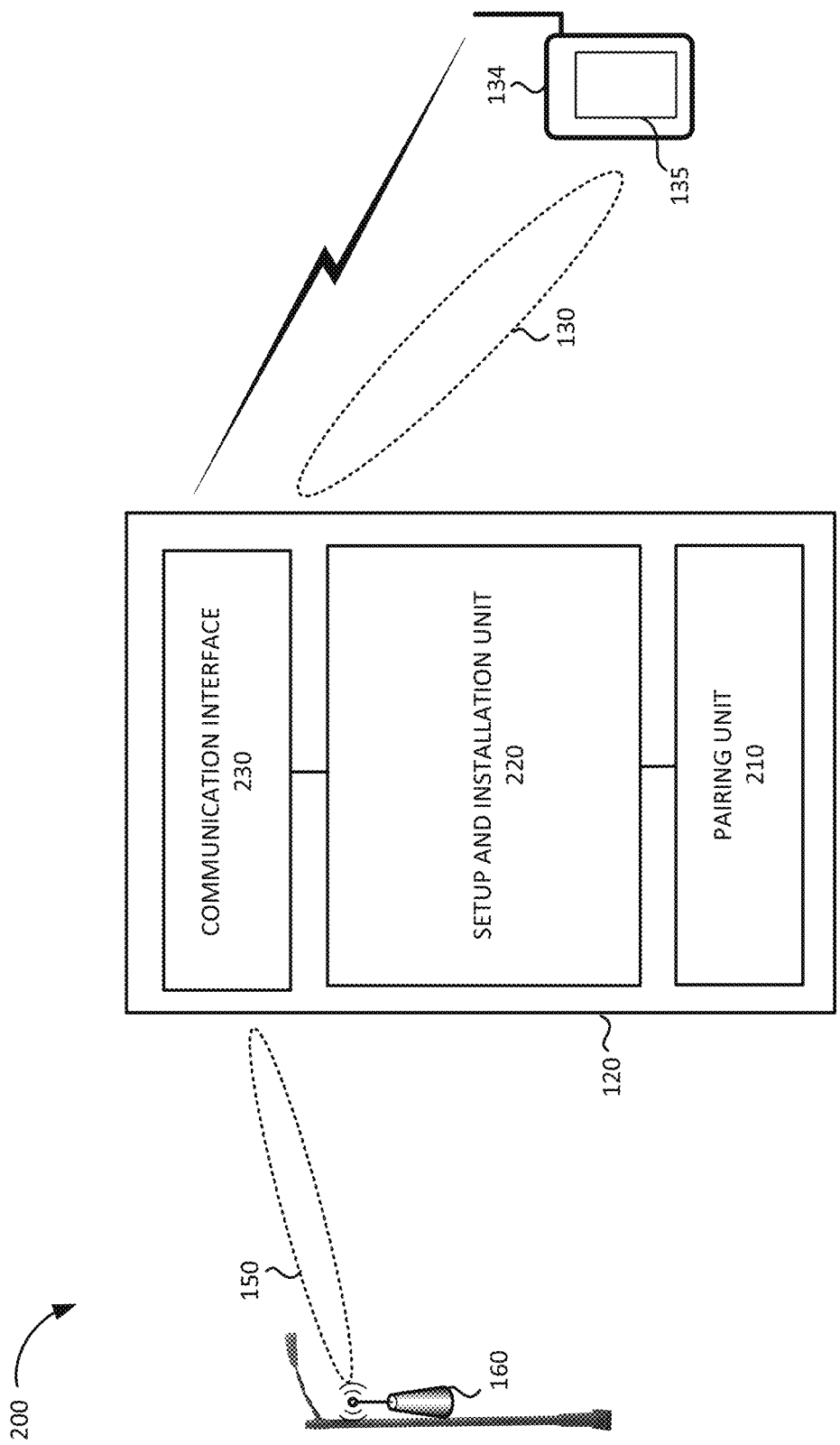
FIG. 2 is a diagram illustrating an exemplary system that includes the FWA device of FIG. 1 according to an implementation described herein.

FIG. 2 is a diagram illustrating an exemplary system 200 that includes FWA device 120. As shown in FIG. 2, system 200 may include wireless station 160, FWA device 120, and user device 134. FWA device 120 may include a pairing unit 210, a setup and installation unit 220, and a communication interface 230. Pairing unit 210 may control connectivity to FWA device 120. Exemplary components of pairing unit 210 are described below with reference to FIG. 4.

Setup and installation unit 220 may include elements to perform read/write operations in conjunction with messages exchanged with CPE control App 135. For example, setup and installation unit 220 may include elements to obtain information such as signal strength, SIM activation information, software updates, etc., to setup and install CPE device in CPE network 140 in configurations that meet SLA requirements. In one implementation, setup and installation unit 220 may obtain and store service profiles associated with user device 134 and make determinations about appropriate locations of CPE devices based on the SLA requirements.

Communication interface 230 may include components capable of sending and receiving wireless signals. For example, communication interface 230 may enable pairing unit 210 and/or setup and installation unit 220 to communicate with CPE control App 135. In one implementation, communication interface 230 may include a display device (e.g., LED, LCD, etc.) that is capable of displaying a visual activation code (e.g., PIN), such as a a bar code, a QR code, an alphanumeric code, a numeric code, a data matrix, text, and/or any other scannable code or other unique identifier that is generated by pairing unit 210. In other implementations, communication interface 230 may include elements capable of performing near field communication (NFC) with CPE control App 135 associated with a pairing process. In still other implementations, communication interface 230 may include elements capable of emitting a tagged audio signal transmitting the one-time activation code.

Although FIG. 2 shows exemplary components of system 200, in other implementations, system 200 may include fewer components, different components, differently arranged components, or additional functional components than depicted in FIG. 2.

Figure 3:
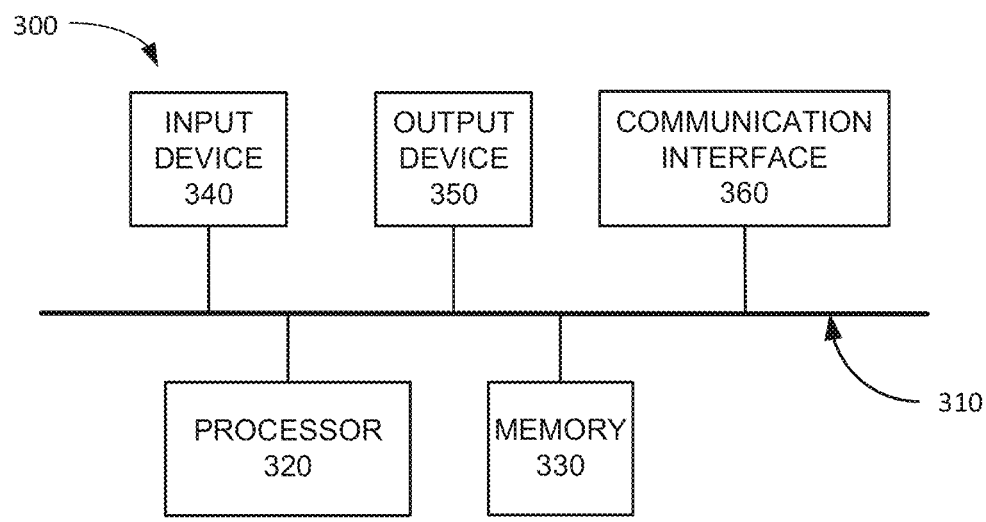
FIG. 3 is a diagram illustrating exemplary components of a device that may be included in a component of FIG. 1 according to an implementation described herein.

FIG. 3 is a diagram illustrating example components of a device 300 according to an implementation described herein. FWA device 120, repeater device 125, WiFi AP 132, user device 134, and/or 5G wireless station 160 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to an FWA device configured to dynamically generate a one-time PIN for pairing with a user device. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
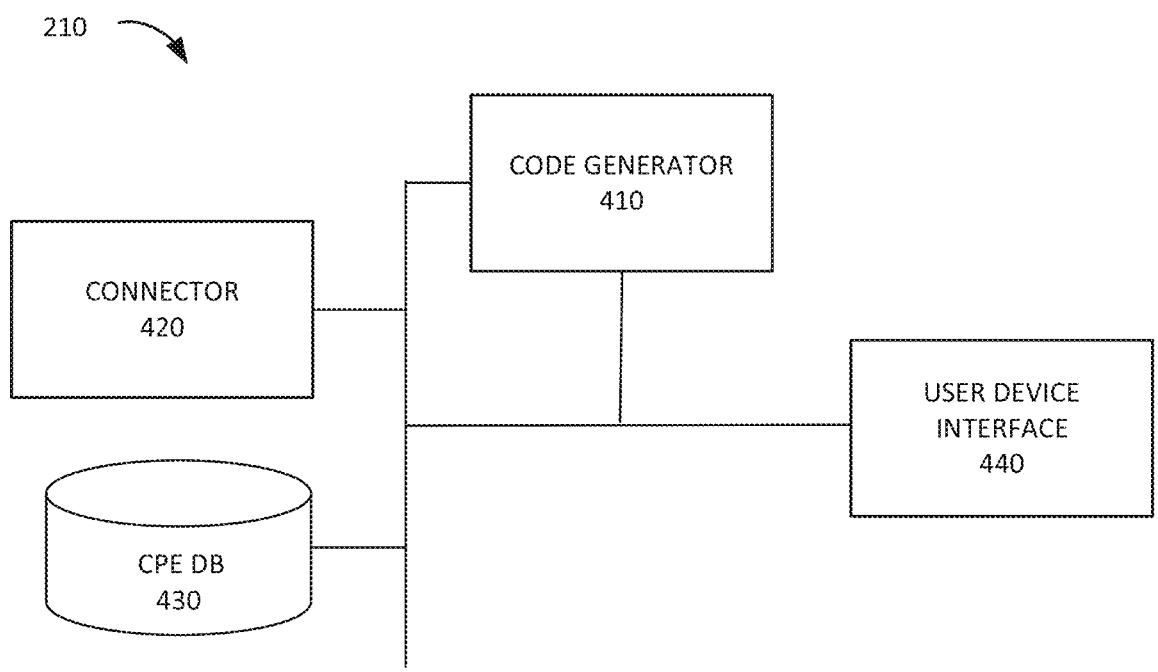
FIG. 4 is a diagram illustrating exemplary components of the pairing unit of FIG. 2 according to an implementation described herein.

FIG. 4 is a diagram illustrating exemplary functional components of pairing unit 210. The components of pairing unit 210 may be implemented, for example, via processor 320 executing instructions from memory 330. Alternatively, some or all of the functional components of pairing unit 210 may be implemented via hard-wired circuitry. As shown in FIG. 4, pairing unit 210 may include a code generator 410, a connector 420, a CPE database (DB) 430, and a user device interface 440.

Code generator 410 may generate a dynamic, one-time activation code or other unique ID to be used for securely pairing FWA device 120 with user device 134 executing CPE control App 135. For example, Code generator 410 may generate the activation code based on a triggering event such as completion of Bluetooth® low energy (BLE) secure connection between FWA device 120 and user device 134 based on activation of CPE control App 134. Additionally or alternatively, Code generator 410 may synchronously generate the code at particular intervals. In one implementation, the code may be in the format of a visual code, such as a bar code, a QR code, an alphanumeric code, a numerical code, text, and/or any other scannable code. In other implementations, the activation code may be communicated in a format suitable for NFC exchange between FWA device 120 and CPE control App 135. In still other implementations, the activation code may by communicated in the format of a tagged audio signal.

Connector 420 may perform WiFi and/or short-range wireless (e.g., Bluetooth®) connections with FWA device 120 and/or other CPE devices. For example, connector 420 may support BLE secure connections such as numeric comparison, passkey, out-of-band, Just Works™, and others. Connector 420 may enable WiFi and/or short-range wireless connections between FWA device 120 and user device 134 based on CPE control App 135 obtaining the one-time activation code generated by code generator 410.

CPE DB 430 may store information associated with a user of user device 134. For example, CPE DB 430 may store CPE device IDs, SLA data, service profiles, etc. CPE DB 430 may store information that is used by code generator 410 to dynamically generate a one-time activation code (e.g., PIN), and store information that is used by connector 420 to establish short-range connections between FWA device 120 and user device 134 using CPE control App 135.

User device interface 440 may be configured to communicate with user device 134 and CPE device in CPE network 110. For example, user device interface 440 may obtain, from code generator 410 and/or connector 420, a one-time activation code to provide to CPE control App 135. In one implementation, user device interface 440 may display the activation code so that a user of user device 134 may scan and capture the displayed code. In other implementations, user device interface 440 may transfer the activation code via an NFC operation. In still other implementations, user device interface 440 may transfer the activation code via a tagged audio signal.

Although FIG. 4 shows exemplary components of pairing unit 210, in other implementations, pairing unit 210 may include fewer components, different components, differently arranged components, or additional components than depicted in FIG. 4. Additionally, or alternatively, one or more components of pairing unit 210 may perform functions described as being performed by one or more other components of pairing unit 210.

Figure 5:
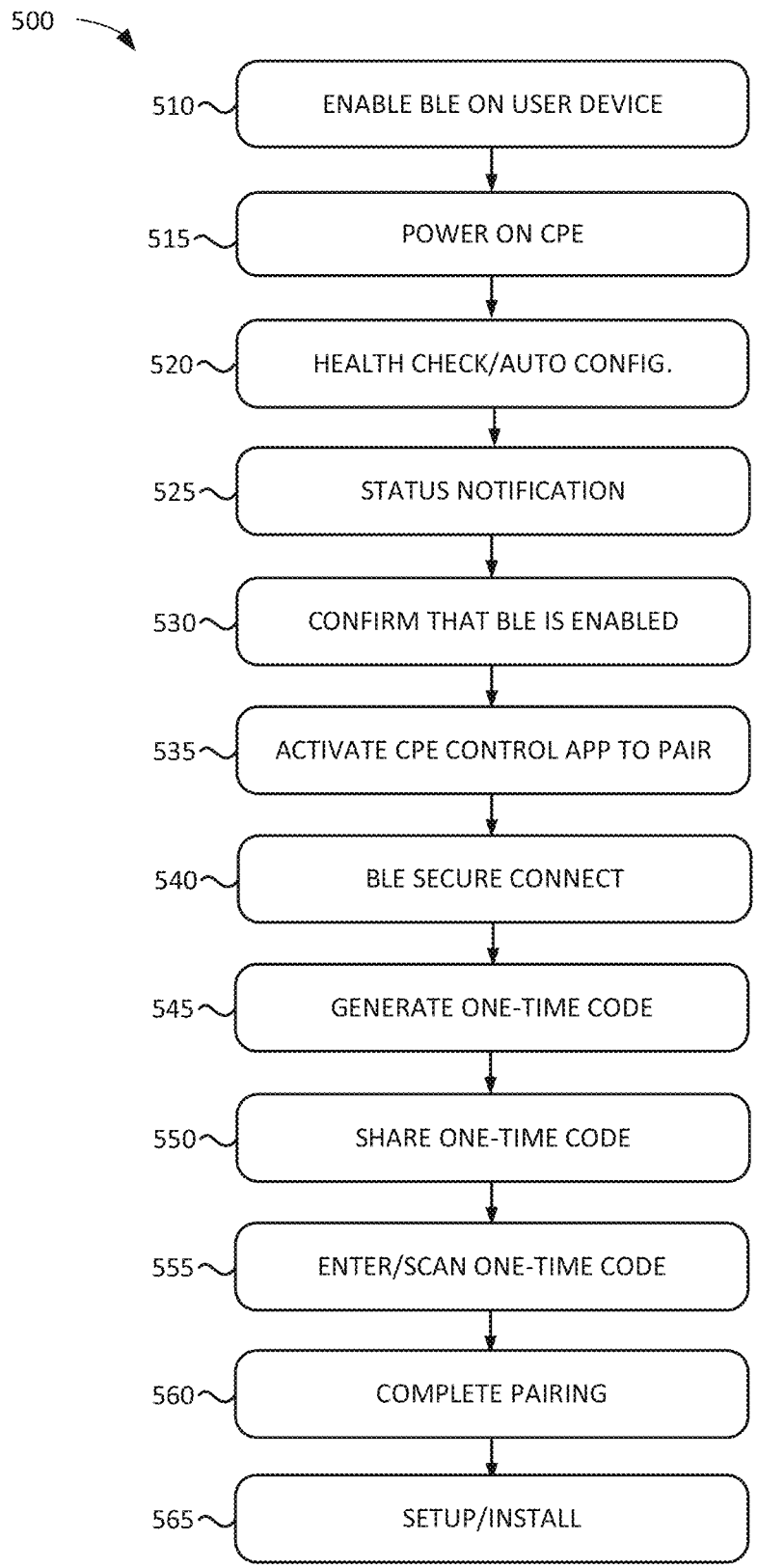
FIG. 5 is a flowchart of a process for using a short-range wireless connection for CPE setup and installation according to an implementation described herein.

FIG. 5 is a flowchart of a process 500 for dynamically generating a one-time activation code for short-range wireless connectivity for use in CPE setup and/or installation according to implementations described herein. Process 500 is described below with reference to messaging/operations diagram 600 illustrated in FIG. 6. In some implementations, process 500 may be performed by FWA device 120 and/or CPE control App 135. In other implementations, some or all of process 500 may be performed by another device or a group of devices separate from FWA device 120 and CPE control App 135.

Process 500 may include enabling of a Bluetooth® low energy (BLE) function 610 on user device 134 (block 510). For example, a user 605 of user device 134 may activate the BLE function, for example, via CPE control App 135. Process 500 may include the powering on 615 of one or more CPE device, including FWA device 120 (block 515). In one implementation, blocks 510 and 515 may be associated with a user setup and installation of CPE devices. In another implementation, blocks 510 and 515 may be associated with a setup and installation of CPE devices by a professional installer.

Once powered on, FWA device 120 may perform a health check and/or an auto configuration 620 (block 520). In other implementations, FWA device 120 may perform other operations upon boot-up. Process 500 may include FWA device 120 sending a status notification 625 to CPE control App 135 (block 625). User 605 may confirm that BLE is enabled 630 on FWA device 120 (block 530). User 605 may then activate BLE pairing 635 on CPE control app 135 (block 535).

Process 500 may include establishing a BLE secure connection 640 between CPE control App 135 and FWA device 120 (block 540). In one implementation, a selection of one of numeric comparison, passkey, out-of-band, or Just Works methods of BLE secure connection may be made, for example, by user 605, CPE control App 135, and/or FWA device 120. FWA device 120 may asynchronously, or alternatively synchronously, generate a one-time code 645 associated with FWA device 120 (block 545). For example, FWA device 120 may generate a visual activation code, such as a QR code. In other implementations, FWA device 120 may generate a unique ID.

FWA device 120 may share the one-time code 650 with CPE control App 135 (block 550). For example, when in the format of a QR code, the one-time code may be displayed via a display associated with FWA device 120. In another implementation, the one-time code may be shared with CPE control App 135 using NFC, by user 605 bringing user device 134 in proximity to FWA device 120. User 605 may enter and/or scan 655 the one-time code via CPE control App 135 (block 555). For example, user device 134 may scan the QR code. Using the one-time code, CPE control App 135 and FWA device 120 may complete the short-term wireless pairing 660 (block 560).

Process 500 may include user 605 and/or the installer performing a setup and/or install of CPE network 110 via the short-range wireless connection (block 565). For example, CPE control App 135 and/or FWA device 120 may perform read/write operations to determine locations of CPE devices in CPE network 110 that will or are likely to provide service to user device 134 according to an SLA requirement.

According to some implementations, dynamic generation of a one-time activation code enables short-range wireless pairing without requiring an installer to know the media access control (MAC) address of FWA device 120 to obtain the correct passkey in preparation for the install. Referring to FIG. 1, one-time code generation has been described with respect to short-range wireless pairing to FWA device 120, but the same can be used for pairing with any other CPE device, such as WiFi AP 132, repeater 125, an extender (not shown), etc. In some implementations, short-range wireless pairing may be enabled based on a number of events. For example, short-range wireless pairing may be enabled when FWA device 120 (or another CPE device) initially boots up, and/or when a fault or failure is experienced in CPE network 110. In other implementations, short-range wireless pairing may be enabled based on passive listening on particular communication channels. For example, enabling short-range wireless connections may be triggered based on a detected proximity of CPE control App 135 to FWA device 120. As another example, short-range wireless connections may be triggered based on FWA device 120 receiving a broadcast message to generate a one-time activation code. In other examples, short-range wireless connections may be triggered based on events such as "port knocking" and/or "frequency knocking," in which CPE control App 135 sends messages on a specific communication frequency according to a pattern.

In the preceding, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Figure 6:
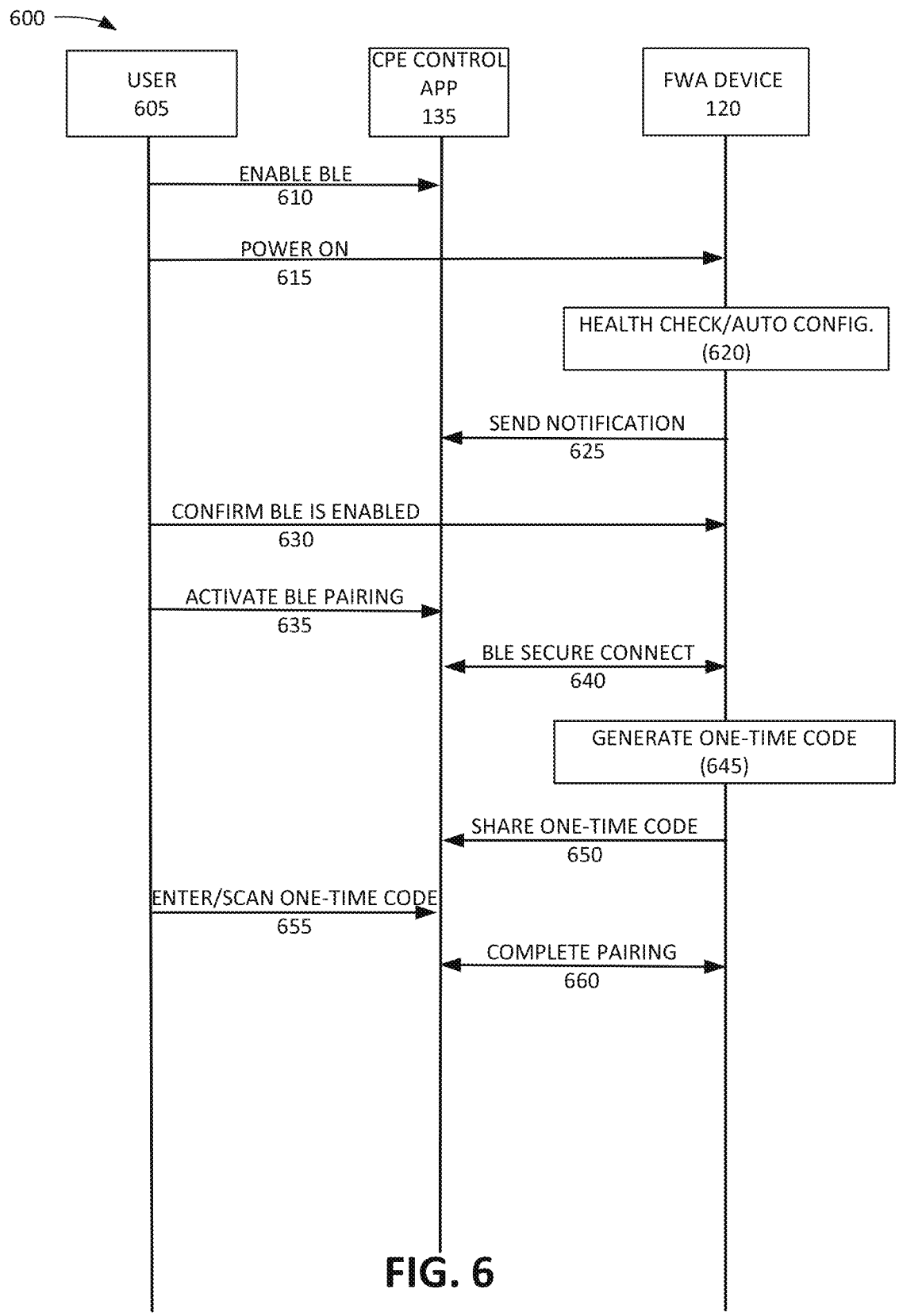
FIG. 6 is a diagram of an exemplary messaging/operations diagram according to an implementation described herein.

For example, while a series of blocks have been described with respect to FIG. 5, and a series of signal flows has been described with respect to FIG. 6, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   establishing, by a fixed wireless access (FWA) device in a customer premises equipment (CPE) network, a communication channel with a user device, wherein the FWA device connects the CPE network to a wireless station for accessing data networks;
   dynamically generating, by the FWA device, a first one-time personal identification number (PIN);
   sharing, by the FWA device, the first one-time PIN with the user device;
   pairing, by the FWA device and based on activation of the first one-time PIN, the user device via a first short-range connection;
   performing, by the FWA device using the first short-range connection and a control application executing on the user device, at least one of setup or installation procedures of one or more devices in the CPE network, wherein the first short-range connection is disabled upon a period of inactivity and without completion of the at least one of setup or installation procedures;
   dynamically generating, by the FWA device responsive to the disabling, a second one-time PIN that differs from the first one-time PIN;
   sharing, by the FWA device, the second one-time PIN with the user device;
   pairing, by the FWA device and based on activation of the second one-time PIN, the user device via a second short-range connection; and
   completing, by the FWA device using the second short-range connection and the control application, the at least one of setup or installation procedures for the one or more devices.

2. The method of claim 1, wherein the first short-range connection comprises at least one of a Bluetooth® connection, an Insteon® connection, an Infrared Data Association connection, a wireless universal serial bus connection, a Z-Wave® connection or a Zigbee connection.

3. The method of claim 1, wherein performing the at least one of the setup or the installation procedures comprises determining a location, of the one or more devices, which meets a service level agreement associated with a service provided to the one or more devices.

4. The method of claim 1, wherein dynamically generating the first one-time PIN comprises generating a visual activation code.

5. The method of claim 4, wherein sharing the first one-time PIN comprises displaying the visual activation code via a display associated with the FWA device.

6. The method of claim 5, wherein activation of the first one-time PIN comprises scanning of the visual activation code by the user device.

7. The method of claim 1, wherein sharing of the first one-time PIN comprises transfer of the first one-time PIN via near field communication (NFC).

8. A network device comprising:
a communication interface;
a memory for storing instructions; and
a processor configured to execute the instructions to:
establish a communication channel with a user device;
dynamically generate a first one-time personal identification number (PIN);
share the first one-time PIN with the user device;
pair, based on activation of the first one-time PIN, with the user device via a first short-range connection;
perform, via the short-range connection and a control application executing on the user device, at least one of setup or installation procedures of one or more devices in a customer premises equipment (CPE) network, wherein the first short-range connection is disabled upon a period of inactivity and without completion of the at least one of setup or installation procedures;
dynamically generate, responsive to the disabling, a second one-time PIN that differs from the first one-time PIN;
share the second one-time PIN with the user device;
pair, based on activation of the second one-time PIN, the user device via a second short-range connection; and
complete, using the second short-range connection and the control application, the at least one of setup or installation procedures for the one or more devices.

9. The network device of claim 8, wherein the first short-range connection comprises at least one of a Bluetooth® connection, an Insteon® connection, an Infrared Data Association connection, a wireless universal serial bus connection, a Z-Wave® connection or a Zigbee connection.

10. The network device of claim 8, wherein to perform the at least one of the setup or the installation procedures the processor further executes the instructions to determine a location, of the one or more devices, which meets a service level agreement associated with a service provided to the one or more devices.

11. The network device of claim 8, wherein to dynamically generate the first one-time PIN, the processor further executes the instructions to generate a visual activation code.

12. The network device of claim 11, wherein to share the first one-time PIN, the processor further executes the instructions to display the visual activation code via the communication interface.

13. The network device of claim 12, wherein activation of the first one-time PIN comprises scanning of the visual activation code by the user device.

14. The network device of claim 8, wherein to share the first one-time PIN, the processor further executes the instructions to transfer the first one-time PIN via near field communication (NFC).

15. A non-transitory computer-readable medium including instructions that, when executed by a processor of a network device, cause the network device to:
establish a communication channel with a user device;
dynamically generate a first one-time personal identification number (PIN);
share the first one-time PIN with the user device;
pair, based on activation of the first one-time PIN, with the user device via a first short-range connection; and
perform, via the first short-range connection, at least one of setup or installation procedures of one or more devices in a customer premises equipment (CPE) network, wherein the first short-range connection is disabled upon a period of inactivity and without completion of the at least one of setup or installation procedures;
dynamically generate, responsive to the disabling, a second one-time PIN that differs from the first one-time PIN;
share the second one-time PIN with the user device;
pair, based on activation of the second one-time PIN, the user device via a second short-range connection; and
complete, using the second short-range connection and the control application, the at least one of setup or installation procedures for the one or more devices.

16. The non-transitory computer-readable medium of claim 15, further including instructions that, when executed by the processor cause the network device to:
determine a location, of the one or more devices, which meets a service level agreement associated with a service provided to the one or more devices.

17. The non-transitory computer-readable medium of claim 15, wherein to dynamically generate the first one-time PIN, the instructions further cause the network device to generate a visual activation code.

18. The non-transitory computer-readable medium of claim 17, wherein to share the first one-time PIN, the instructions further cause the network device to display the visual activation code via a display.

19. The non-transitory computer-readable medium of claim 18, wherein activation of the first one-time PIN comprises scanning of the visual code by the user device.

20. The non-transitory computer-readable medium of claim 15, wherein to share the first one-time PIN, the instructions further cause the network device to transfer the first one-time PIN via near field communication (NFC).

* * * * *